United States Patent [19]

Hammond

[11] 3,938,828
[45] Feb. 17, 1976

[54] VEHICLE WITH INFLATABLE BUMPER

[76] Inventor: John W. Hammond, 9805 47th Ave., College Park, Md. 20740

[22] Filed: Sept. 5, 1974

[21] Appl. No.: 503,434

[52] U.S. Cl. ............................... 280/261; 280/282
[51] Int. Cl.² .......................................... B62M 1/02
[58] Field of Search ....... 280/261, 282, 1.1, 1.11 A, 280/87.01 R, 87.02 R; 180/2; 301/126; 272/35; 115/27

[56] References Cited
UNITED STATES PATENTS

| | | | |
|---|---|---|---|
| 709,213 | 9/1902 | Fisher | 301/126 |
| 1,467,456 | 9/1923 | Silvius | 272/35 |
| 1,833,844 | 11/1931 | Lusse | 180/2 X |
| 2,958,535 | 11/1960 | Dupree | 280/261 X |
| 2,986,400 | 5/1961 | Phillips | 280/261 X |
| 2,988,370 | 6/1961 | Bertram | 280/87.02 R |
| 3,052,486 | 9/1962 | Malmquist | 280/1.11 A X |
| 3,492,017 | 1/1970 | Czichos | 280/87.02 |
| 3,791,332 | 2/1974 | Gof | 115/27 |

Primary Examiner—Robert R. Song
Assistant Examiner—John A. Pekar
Attorney, Agent, or Firm—John B. Dickman, III

[57] ABSTRACT

An occupant propelled, tricycle type, recreational vehicle has an inflated flexible bag attached to its outer periphery to provide safe, controlled bumping of similar vehicles or other objects for the amusement of the occupant.

7 Claims, 11 Drawing Figures

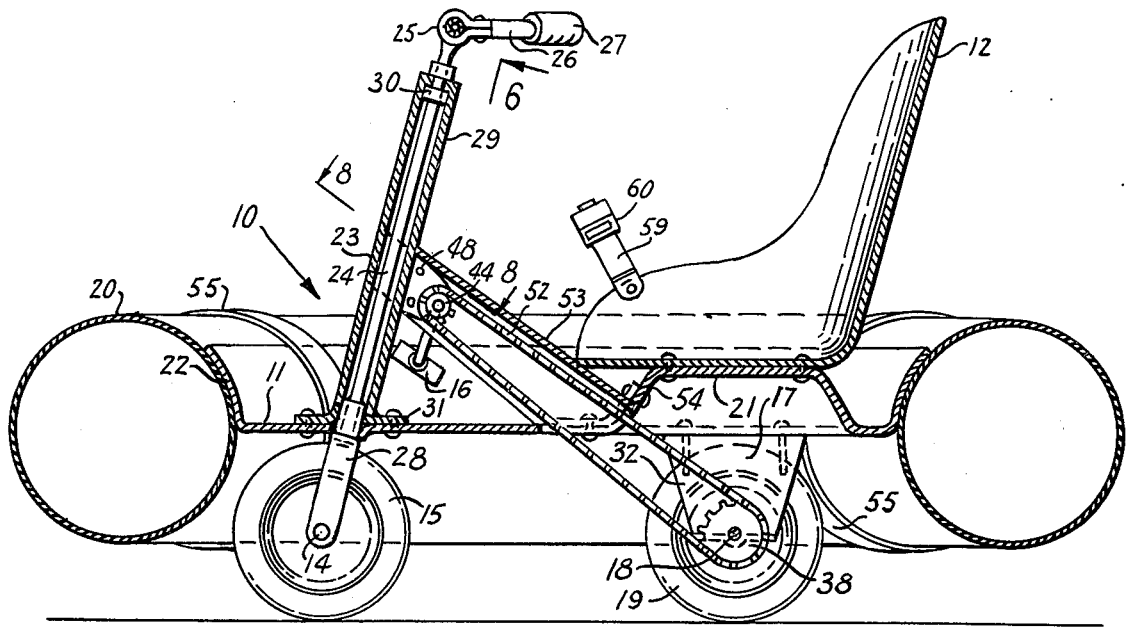
FIG. 3
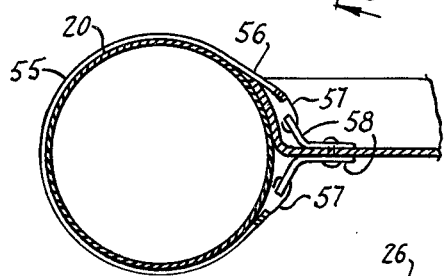
FIG. 5
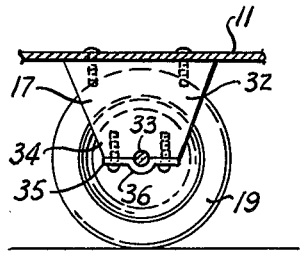
FIG. 4
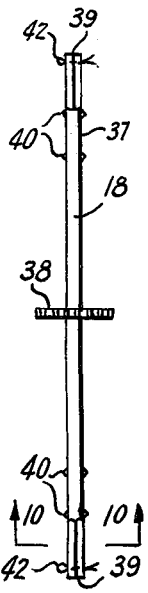
FIG. 9
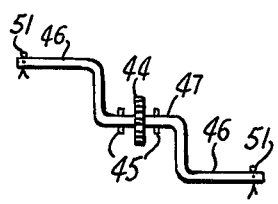
FIG. 7
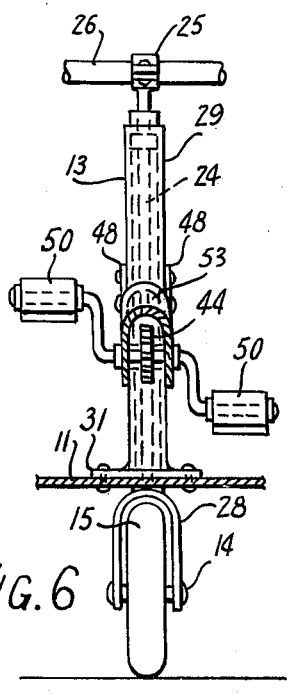
FIG. 6
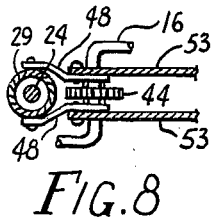
FIG. 8
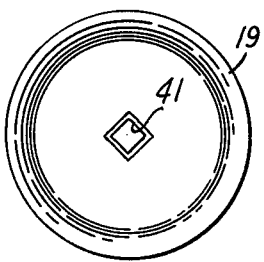
FIG. 10
FIG. 11

VEHICLE WITH INFLATABLE BUMPER

BACKGROUND OF THE INVENTION

One of the most popular amusement rides in a Carnival or Fair is the "Bumper Car". This is usually an electric powered vehicle having a resilient bumper around its outside and is driven by the occupant, who is restrained in his seat by a seat belt, in such a manner as to collide with the other vehicle in the raceway.

These controlled collisions are not overly dangerous as the speed of the vehicle is limited and the resilient bumper absorbs the sharp initial shock of contact.

Although these Bumper Car rides are very popular, they are also prohibitively expensive for an individual.

Therefore it is obvious that a need for an inexpensive, manually powered Bumper Bike which may be used on streets, parking lots or patios, exists.

SUMMARY OF THE INVENTION

The present invention is directed generally to recreational vehicles and more specifically to an occupant propelled Bumper Bike.

It is the primary object of this invention to provide a tricycle type recreational vehicle propelled by manual power and having a flexible inflated bumper around its outside.

It is also an object of this invention to provide a recreational vehicle which may be easily manufactured from inexpensive materials by known methods.

A full understanding of the invention and its further objects and advantages will be had from the following description of which the accompanying drawings are a part.

DESCRIPTION OF THE DRAWINGS

FIG. 3 is a section taken along line 3—3 in FIG. 1.
FIG. 4 is a cut showing the rear axle support assembly taken along line 4—4 in FIG. 1.
FIG. 5 is a cut showing the attachment of the inflatable bumper taken along line 5—5 in FIG. 1.
FIG. 6 is a section showing the steering column assembly and the foot propulsion assembly taken along line 6—6 of FIG. 3.
FIG. 7 is a view of the foot pedal drive shaft and sprocket gear taken along line 7—7 in FIG. 2.
FIG. 8 is a section of the steering column assembly showing the attachment of the foot pedal support brackets and the sprocket chain guard taken along line 8—8 in FIG. 3.
FIG. 9 is a view of the rear axle assembly.
FIG. 10 is a section showing the square ends of the rear axle shaft taken along line 10—10 in FIG. 9.
FIG. 11 is a view of the rear wheel showing the square aperture for receiving the square end of the rear axle shaft.

DESCRIPTION OF THE PREFERRED EMBODIMENT

Figure 1:
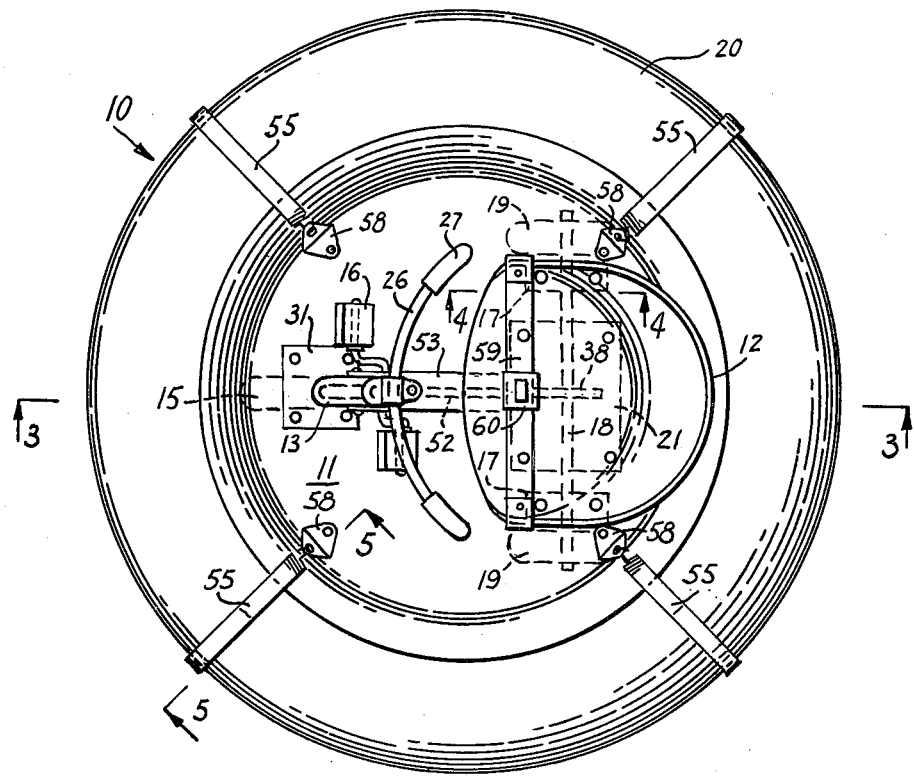
FIG. 1 is a top view of the preferred embodiment.
Figure 2:
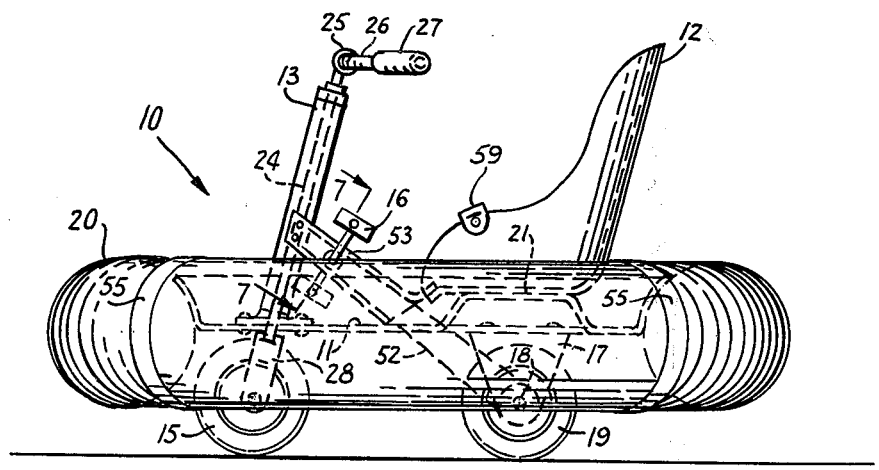
FIG. 2 is a side view of the preferred embodiment.

An occupant propelled, tricycle type, recreational vehicle 10 comprises a floorboard 11, a seat 12, a steering column assembly 13, a front axle 14, a front wheel 15, a foot powered propulsion assembly 16, at least two rear axle support bracket assemblies 17, a rear axle assembly 18, a pair of rear wheels 19, and an inflated bumper 20 removably attached to the outside periphery of the floorboard 11.

The floorboard 11 has an upwardly indented surface 21 for mounting the seat 12 and its outer periphery 22 extends upwardly and adequately to engage the inner surface of the inflatable bumper 20.

The floorboard 11 has apertures therethrough for installing the steering column assembly 13 and the foot powered propulsion assembly 16 to the rear axle assembly 18.

The steering column assembly 13 comprises a shaft housing assembly 23, a steering shaft 24 having a goose-neck clamp 25 engaging a pair of handle bars 26 with handgrips 27 at one end and a "U" shaped fork 28 attached by suitable means at the other end.

The shaft housing assembly 23 comprises a tube 29, having a stepped bore 30 therethrough, attached by suitable means such as welding to an apertured plate 31 which attaches the shaft housing assembly 23 by suitable means to the floorboard 11. The steering shaft 24 extends through, and is suitably journaled inside the shaft housing assembly 23, and the forks 28 engage the front axle 14 supported by the front wheel 15.

As shown in FIG. 4 the two rear axle support bracket assemblies 17 each comprise a flat plate 32 having a semi-circular cutout 33 in its lower end 34 and a flat bar 35 configured with a semi-circular indentation 36. The flat bar 35 is removably engaged by suitable means such as bolts to the flat plate 32 so that the semi-circular cutout 33 and the semi-circular indentation 36, form a round journal. The top end of the flat plate 32 is secured by suitable means to the floorboard 11.

The rear axle assembly 18 comprises a round shaft 37 having a circular sprocket gear 38 attached substantially equal distant from each end by suitable means such as welding.

As shown in FIG. 9 and 10 the shaft 37 has its outer ends 39 configured square and adjacent the square ends 39, the metal of the shaft 37 has been deformed to cause ridges of metal 40 to extend beyond the diameter of the shaft 37.

The rear axle assembly 18 is mounted in the rear axle support bracket assemblies 17 with the brackets 17 engaging the shaft 37 in the area between the extended ridges of metal 40. The shaft 37 will rotate in the journal formed by the semi-circular cutout 33 in the plate 32 and the semi-circular indentation 36 in the bar 35.

As shown in FIG. 11 the rear wheels 19 have an aperture 41 therethrough configured to fit the square ends 39 of the shaft 37 and are retained on the shaft 37 by cotter pins 42.

As shown in FIGS. 3, 6 and 7 the foot powered propulsion assembly 16 comprises a pedal drive shaft 43 with a circular sprocket gear 44 attached by suitable means, such as welding at a point substantially equal distant from its ends. Adjacent the sprocket gear 44 the metal of the pedal drive shaft 43 has been deformed to cause ridges of metal 45 to extend beyond the diameter of the shaft 43. The pedal drive shaft 43 is configured to have two pedal support shafts 46 and one center shaft 47.

As shown in FIGS. 3 and 8 the foot powered propulsion assembly 16 is supported for rotation by two support brackets 48 having apertures 49 therethrough and which are attached by suitable means to the steering column assembly 13. The aligned apertures 49 in the support brackets 48 act as journals for the pedal drive shaft 43 and the extended ridges of metal 45 keep the pedal drive shaft 43 from excessive lateral movement. A foot pedal 50 is installed on each pedal support shaft 46 and retained in place by cotter pins 51.

A sprocket chain 52 is engaged around the sprocket gear 44 of the foot powered propulsion assembly 16 and the sprocket gear 38 of the rear axle assembly 18. A chain guard 53 is installed over the chain 52 in the area above the floorboard 11, being secured at one end to the pedal drive shaft support brackets 48 and at the other end to the side 54 of the upwardly indented surface 21 in the floorboard 11.

As shown in FIGS. 1 and 5 the inflatable bumper 20 is removably attached to the outer periphery 22 of the floorboard 11 by a plurality of strap assemblies 55 comprising a flexible web 56 having a hook 57 at each end. The flexible webs 56 encircle the bumper 20 and each hook 57 is engaged in an apertured angle clip 58 which are mounted by suitable means in opposed pairs to the top and bottom surfaces of the floorboard 11.

The seat 12 is mounted by suitable means to the upwardly indented surface 21 of the floorboard 11. The seat 12 is equiped with a flexible safety belt 59 having fastening means 60.

In operation the occupant in the seat 12 will fasten the safety belt 59 and by pedaling the foot powered propulsion unit 16 set the vehicle 10 in motion. By controlling his rate of speed the vehicle 10 may be deliberately collided with a similar vehicle or other object whereby the inflated bumper will take the initial shock of the collision. In the event there is damage to the inflated bumper it is a very easy matter to take it off and repair it.

I claim:

1. An occupant propelled, tricycle type, recreational bumper vehicle comprising:
   a. a floorboard;
   b. a seat attached to said floorboard;
   c. a steering column assembly attached to and extending through said floorboard to engage;
   d. a front axle, supported by;
   e. a front wheel;
   f. a foot powered propulsion assembly attached to said steering column assembly;
   g. at least two rear axle support bracket assemblies attached to said floorboard and supporting;
   h. a rear axle assembly supported by;
   i. two rear wheels;
   j. a sprocket chain engaged between said foot powered propulsion assembly and said rear axle assembly whereby mobility for said vehicle may be obtained;
   k. a safety guard for covering said sprocket chain in the area above said floorboard;
   l. an inflatable bumper removably attached to the outside periphery of said floorboard;
   m. said steering assembly comprising;
   n. a shaft housing assembly;
   o. a steering shaft, having at one end;
   p. a gooseneck clamp, engaging;
   q. a pair of handlebars, having;
   r. handgrips;
   s. said steering shaft having at its other end a "U" shaped fork;
   t. said shaft housing assembly comprising;
   u. a tube, having;
   v. a stepped bore therethrough for bearing engagement with the steering shaft; and
   w. said tube being attached at its lower end to a plate having an aperture therethrough for connection to the floorboard.

2. The vehicle as described in claim 1 wherein said foot powered propulsion assembly comprises:
   a. a pedal drive shaft, having;
   b. a circular sprocket gear attached.

3. The vehicle as described in claim 2 wherein said foot pedal is installed at each end of said pedal drive shaft.

4. The vehicle as described in claim 1 wherein said rear axle support bracket assembly comprises:
   a. a flat plate; having
   b. a semi-circular cutout in one end;
   c. a flat bar; having
   d. a semi-circular identation therein; and
   e. said flat bar being removably attached to said flat plate.

5. The vehicle as described in claim 4 wherein said round shaft of said rear axle assembly is engaged for rotation in said semi-circular cutout and said semi-circular indentation.

6. The vehicle as described in claim 1 wherein said rear axle assembly comprises:
   a. a round shaft; having
   b. a circular sprocket gear attached; and
   c. said round shaft having its ends configured square.

7. The vehicle as described in claim 6 wherein a rear wheel is installed on each end of said round shaft.

* * * * *